United States Patent
Zhang et al.

(10) Patent No.: US 11,436,249 B1
(45) Date of Patent: Sep. 6, 2022

(54) TRANSFORMATION OF COMPOSITE TABLES INTO STRUCTURED DATABASE CONTENT

(71) Applicant: International Business Machines Corporation, Armonk, NY (US)

(72) Inventors: Xue Lan Zhang, Beijing (CN); Hai Cheng Wang, Beijing (CN); Jing Zhang, Beijing (CN); Jun Hong Zhao, Beijing (CN); Ang Yi, Beijing (CN); Dong Rui Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/213,488

(22) Filed: Mar. 26, 2021

(51) Int. Cl.
*G06F 16/22* (2019.01)
*G06F 16/25* (2019.01)
*G06F 40/18* (2020.01)

(52) U.S. Cl.
CPC ........ *G06F 16/258* (2019.01); *G06F 16/2246* (2019.01); *G06F 16/2282* (2019.01); *G06F 40/18* (2020.01)

(58) Field of Classification Search
None
See application file for complete search history.

(56) References Cited

U.S. PATENT DOCUMENTS

| | | | | |
|---|---|---|---|---|
| 5,317,686 A | * | 5/1994 | Salas | G06F 40/18 715/835 |
| 5,359,724 A | * | 10/1994 | Earle | G06F 12/0207 711/E12.003 |
| 5,794,229 A | * | 8/1998 | French | G06F 16/221 |
| 7,328,400 B2 | * | 2/2008 | Van Patten Benhase | G06F 40/177 715/227 |
| 7,392,210 B1 | * | 6/2008 | MacKay | G06Q 20/10 705/35 |

(Continued)

FOREIGN PATENT DOCUMENTS

WO 2019075969 A1 4/2019

OTHER PUBLICATIONS

"Tables—Amazon Textract", Developer's Guide, Amazon Web Services, © 2021, 3 pages, <https://docs.aws.amazon.com/textract/latest/dg/how-it-works-tables.html>.

(Continued)

*Primary Examiner* — Wilson Lee
(74) *Attorney, Agent, or Firm* — Michael A. Petrocelli

(57) ABSTRACT

A computer transforms content of a composite table into structured data objects. The computer receives a composite table and identifying a data zone characterized by data columns, and a header zone. The computer identifies first header cells arranged coextensive with a single data column and second header cells arranged coextensive with a set of data columns. The computer generates a hierarchical representation of said header cells, based at least in part, on the header cell arrangements. The computer generates a revised table based on the hierarchical representation, with the first header cells identifying a data column and the second header cells identify a first header cell. The computer generates structured data objects representing the zones and being arranged based, at least in part, on the revised table and where the structured data objects are keyed to the first header cells.

20 Claims, 16 Drawing Sheets

(56) References Cited

U.S. PATENT DOCUMENTS

| | | | |
|---|---|---|---|
| 9,251,413 | B2 | 2/2016 | Meier |
| 9,311,371 | B2 | 4/2016 | Mohan |
| 9,495,347 | B2 | 11/2016 | Stadermann |
| 9,785,830 | B2 | 10/2017 | Hausmann |
| 10,409,890 | B2* | 9/2019 | Geisler .................. G06F 17/18 |
| 10,740,545 | B2* | 8/2020 | Allen ..................... G06F 40/18 |
| 11,194,798 | B2* | 12/2021 | Canim ................... G06F 40/157 |
| 2007/0112724 | A1* | 5/2007 | Beach ..................... G06F 16/20 |
| 2012/0330900 | A1* | 12/2012 | Patwardhan ........ G06F 16/2462 |
| | | | 707/690 |
| 2015/0007010 | A1* | 1/2015 | Byron ..................... G06F 40/20 |
| | | | 715/227 |
| 2015/0067463 | A1* | 3/2015 | Chin ....................... G06F 40/18 |
| | | | 715/212 |
| 2017/0139874 | A1* | 5/2017 | Chin ................... G06F 40/143 |
| 2018/0102817 | A1* | 4/2018 | Park ..................... H04L 5/0057 |
| 2018/0157468 | A1* | 6/2018 | Stachura ................... G06F 8/34 |
| 2018/0293218 | A1* | 10/2018 | Mungi ................... G06F 40/18 |
| 2019/0095472 | A1* | 3/2019 | Griffith ................ G06F 16/285 |
| 2019/0114251 | A1* | 4/2019 | Sapozhnikov ... G06Q 10/06393 |
| 2019/0272315 | A1* | 9/2019 | Walia .................... G06F 40/205 |
| 2019/0340240 | A1 | 11/2019 | Duta |
| 2020/0081968 | A1* | 3/2020 | Flisakowski .......... G06F 40/103 |
| 2020/0097451 | A1 | 3/2020 | Pisipati |
| 2020/0134092 | A1* | 4/2020 | Yanosy, Jr ............ G06F 16/367 |
| 2020/0159820 | A1* | 5/2020 | Rodriguez ............ G06F 40/137 |
| 2020/0334250 | A1* | 10/2020 | Canim ................ G06F 16/2458 |
| 2020/0364235 | A1* | 11/2020 | Kannan ................ G06F 16/258 |
| 2021/0042309 | A1* | 2/2021 | Mustafi ................ G06F 16/258 |
| 2021/0109993 | A1* | 4/2021 | Nadim .................. G06F 40/177 |

OTHER PUBLICATIONS

Mell, et al., "The NIST Definition of Cloud Computing", National Institute of Standards and Technology, Special Publication 800-145, Sep. 2011, 7 pages.

Xiang, et al., "A Flexible Method for Converting Non-Relational Text Data to Relational Data for Data Acquisition of Equipment Operation", Procedia Manufacturing vol. 37, 2019, pp. 367-374.

* cited by examiner

|   | A | B | C | D | E | F |
|---|---|---|---|---|---|---|
| 1 | ID | Name | | Address | | |
| 2 | | SurName | FirstName | Country | State/Region | City |
| 3 | 1 | Zhang | San | USA | Texas | Dallas |
| 4 | 2 | Li | Si | USA | Georgia | Atlanta |
| 5 | 3 | Wang | Wu | China | Heibei | ShiJiaZhuang |

FIG. 3

| ID | Name | | Address | | |
|---|---|---|---|---|---|
| | SurName | FirstName | Country | State/Region | City |

FIG. 4A

| 1 | Zhang | San | USA | Texas | Dallas |
|---|---|---|---|---|---|
| 2 | Li | Si | USA | Georgia | Atlanta |
| 3 | Wang | Wu | China | Heibei | ShiJiaZhuang |

Slide 18

FIG. 4B

| Text | Root |
|---|---|
| Level | 2 |
| Parent | Null |
| Cell | Null |

FIG. 5A

| Text | Address |
|---|---|
| Level | 1 |
| Parent | Root |
| Cell | * |

FIG. 5B

| Text | CITY |
|---|---|
| Level | 0 |
| Parent | Address |
| Cell | * |

FIG. 5C

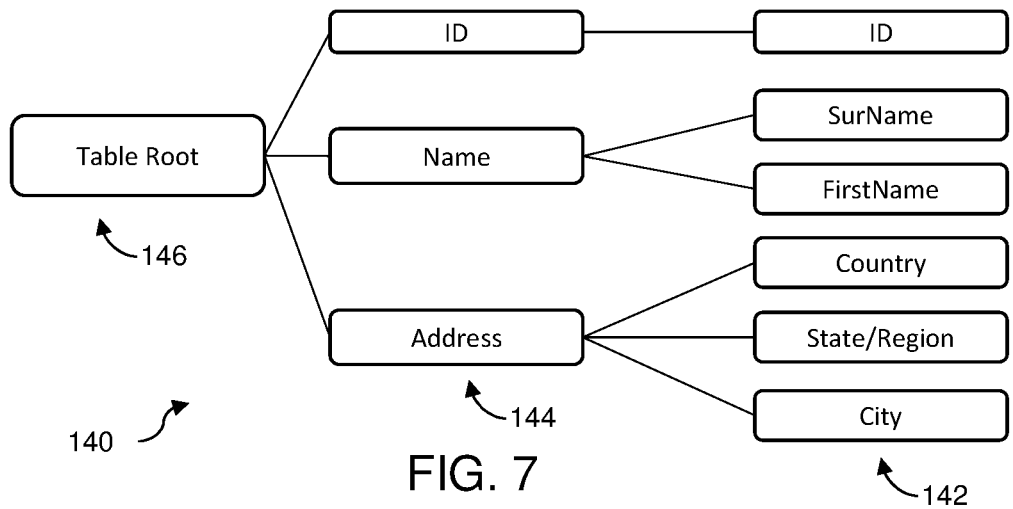

```
[{
"id": "1",
"SurName": "Zhang",
"FirstName": "San",
"Country": "China",
"Province": "Beijing",
"City": "Beijing"
},
{
"id": "2",
"SurName": "Li",
"FirstName": "Si",
"Country": "USA",
"Province": "NewYork",
"City": "NewYork"
},
{
"id": "3",
"SurName": "Wang",
"FirstName": "Wu",
"Country": "China",
"Province": "Heibei",
"City": "ShiJiaZhuang"
}
]
```

110

| MARKS&NOS | COLOR | CTNC NC | CTNS | SIZE/RATIO | | | | QUANTITY |
|---|---|---|---|---|---|---|---|---|
| | P.NO: P123 | | | S1 | S2 | S3 | PCS | |
| 1*2*3 | GRAY | 1-3 | 3 | 15 | 30 | 45 | 90 | 96 |
| | | 4 | 1 | 1 | 2 | 3 | 6 | |
| | P.NO: P456 | | | S1 | S2 | S3 | PCS | |
| 2*2*1 | NAVY | 1-2 | 2 | 6 | 12 | 18 | 36 | 48 |
| | | 3 | 1 | 2 | 4 | 6 | 12 | |
| | PINK | 1-2 | 2 | 6 | 12 | 18 | 6 | 48 |
| | | 3 | 1 | 2 | 4 | 6 | 12 | |
| 2*2*2 | RED | 1-2 | 2 | 6 | 12 | 18 | 6 | 48 |
| | | 3 | 1 | 2 | 4 | 6 | 12 | |
| TOTAL | | | 13 | | | | | 240 |

FIG. 13A

| MARKS&NOS | COLOR | CTNC NC | CTNS | SIZE/RATIO | | | |
|---|---|---|---|---|---|---|---|
| | P.NO: P123 | | | S1 | S2 | S3 | PCS |

FIG. 13B

| MARKS&NOS | COLOR | CTNC NC | CTNS | SIZE/RATIO | | | |
|---|---|---|---|---|---|---|---|
| | P.NO: P456 | | | S1 | S2 | S3 | PCS |

FIG. 13C

| ID | * |
|---|---|
| Name | P.NO |
| Value | P123 |
| Type | Information |
| Scope | {A,2,I,4) |
| Action | Split |

FIG. 13D ← 150

| P.NO: P123 |
|---|

FIG. 13E ← 120

| MARKS&NOS | COLOR | CTNC NC | CTNS | SIZE/RATIO | | | |
|---|---|---|---|---|---|---|---|
|  |  |  |  | S1 | S2 | S3 | PCS |

106 → FIG. 13F

| MARKS&NOS | COLOR | CTNC NC | CTNS | SIZE/RATIO | | | |
|---|---|---|---|---|---|---|---|
| MARKS&NOS | COLOR | CTNC NC | CTNS | S1 | S2 | S3 | PCS |

FIG. 13G ← 146

| MARKS&NOS | | | COLOR | CTNC NC | CTNS | SIZE/RATIO |
|---|---|---|---|---|---|---|
| P.NO: P123 | | | S1 | S2 | S3 | PCS |
| 1*2*3 | GRAY | 1-3 | 3 | 15 | 30 | 45 | 90 |
| | | 4 | 1 | 1 | 2 | 3 | 6 |

| MARKS&NOS | | | COLOR | CTNC NC | CTNS | SIZE/RATIO |
|---|---|---|---|---|---|---|
| P.NO: P456 | | | S1 | S2 | S3 | PCS |
| 2*2*1 | NAVY | 1-2 | 2 | 6 | 12 | 18 | 36 |
| | | 3 | 1 | 2 | 4 | 6 | 12 |
| | PINK | 1-2 | 2 | 6 | 12 | 18 | 6 |
| | | 3 | 1 | 2 | 4 | 6 | 12 |
| 2*2*2 | RED | 1-2 | 2 | 6 | 12 | 18 | 6 |
| | | 3 | 1 | 2 | 4 | 6 | 12 |
| TOTAL | | | 13 | | | | |

```
[
  {
    "P.NO": "P123",
    "MARKS&NOS": "1*2*3",
    "COLOR": "GRAY",
    "CTNC NC": "1-3",
    "CTNS": "3",
    "SIZE RATIO": {
      "S1": "15",
      "S2": "30",
      "S3": "45",
      "PCS": "90"
    }
  },
  ......
  {
    "MARKS&NOS": "1*2*3",
    "COLOR": "GRAY",
    "QUANTITY": "96"
  },
  {
    "MARKS&NOS": "1*2*3",
    "COLOR": "NAVY",
    "QUANTITY": "48"
  },
  ......
  Total:{
    "CTNS": "13",
    "QUANTITY": "240"
  }
]
```
↖ 112

TRANSFORMATION OF COMPOSITE TABLES INTO STRUCTURED DATABASE CONTENT

BACKGROUND

The present invention relates generally to the field of structured data, and more specifically, to the computerized extraction of structured data from tables using artificial intelligence.

Computerized utilities to automatically locate and transform unstructured data within electronic files can reduce data processing time. For example, some utilities can identify tabular documents (e.g., documents that contain lines of data arranged into rows and columns with corresponding headers for the various rows and columns) and extract information contained in the identified tables. Once the data is extracted, it may be made available for storage or use in various applications. Unfortunately, tables of data may be arranged in many ways, and automated data extraction methods may misidentify data lines and data headers. Incorrectly extracted data leads to inaccurate calculations and, in some cases, may lead to the results that are unusable.

SUMMARY

According to one embodiment, a computer-implemented method to transform content of a composite table into structured data objects comprises receiving by a computer, from a document source, a document including a composite table. The computer identifies, within the table, a data zone with data cells arranged into a group of data columns, and a header zone. The computer identifies, within the header zone, a group of first header cells which are coextensive with a single data column and a group of second header cells which are coextensive with a set of data columns. The computer generates a hierarchical representation of the header cells, based at least in part, on the header cell arrangements. The computer generates a revised table according, at least in part, to the hierarchical representation, wherein the first header cells identify a data column and the second header cells identify a first header cell. The computer generates a set of structured data objects representing the zones and having an arrangement based, at least in part, on the revised table and wherein the set of structured data objects is keyed to the group of first header cells. According to aspects of the invention, the set of structured data objects is further indexed according to the group of second header cells. According to aspects of the invention, the composite table further includes at least additional one zone having content selected from a list of categories consisting of "table label" and "table accumulation data"; and further including mapping said additional zone content to said revised table, wherein said set of structured data objects includes a representation of additional zone content. According to aspects of the invention, the identification of the group of zones is conducted by iteratively assessing content of the tabular document in a bottom-to-top direction, whereby the at least one data zone is identified before the header zone is identified. According to aspects of the invention, the computer documents cell attribute metadata for the plurality of data cells and header cells, the cell attribute metadata being selected from a list consisting of "cell content name", "cell content value", "cell content type", "cell location range", "cell transformation action", "cell appearance" and uses the attribute metadata to generate said hierarchical structure. According to aspects of the invention, the set of structured data objects is generated by the computer based, as least in part, on said cell attribute metadata. According to aspects of the invention, the header cell arrangements are identified by the computer based, at least in part, by examining at least one attribute associated with said header zones selected from a list consisting of "semantic relationship among first header cells and said second header cells determined by a natural language processing method", and a cell content meaning established in a reference available to the computer.

According to another embodiment, a system to transform content of a composite table into structured data objects, comprises: a computer system comprising a computer readable storage medium having program instructions embodied therewith, the program instructions executable by a computer to cause the computer to: receive, from a document source, a document including a composite table; identify, within said table, a data zone characterized a plurality of data cells arranged into a plurality of data columns, and a header zone; identify, within said header zone, a plurality of first header cells which are coextensive with a single data column and a plurality of second header cells which are coextensive with a set of data columns; generate, a hierarchical representation of said header cells, based at least in part, on said header cell arrangements; generate, a revised table according, at least in part, to said hierarchical representation, wherein the first header cells identify a data column and said second header cells identify a first header cell; and generate, a set of structured data objects representing said zones and having an arrangement based, at least in part, on said revised table and wherein said set of structured data objects is keyed to said plurality of first header cells.

According to another embodiment, a computer program product to transform content of a composite table into structured data objects, comprises a computer readable storage medium having program instructions embodied therewith, the program instructions executable by a computer to cause the computer to: receive using a computer, from a document source, a document including a composite table; identify, using the computer, within said table, a data zone characterized a plurality of data cells arranged into a plurality of data columns, and a header zone; identify, using the computer, within said header zone, a plurality of first header cells which are coextensive with a single data column and a plurality of second header cells which are coextensive with a corresponding set of data columns; generate, using the computer, a hierarchical representation of said header cells, based at least in part, on said header cell arrangements; generate, using the computer, a revised table according, at least in part, to said hierarchical representation, wherein the first header cells identify a data column and said second header cells identify a first header cell; and generate, using the computer, a set of structured data objects representing said zones and having an arrangement based, at least in part, on said revised table and wherein said set of structured data objects is keyed to said plurality of first header cells.

The present disclosure recognizes and addresses the shortcomings and problems associated with automated data extraction utilities. Embodiments of the invention, transform composite tables (e.g., tables with non-uniform headers) to structured data by abstracting table data relationships using cell attribute units that represent table content during transformation from tabular form to structured data form that can be directly used by data storage systems, applications, and application services.

Aspects of the invention are especially suited for transforming or converting composite table (e.g., tables with multiple header or non-uniform arrangements) to complex structured data. Aspects of the invention include a table deconstruction module to retrieve table areas in a bottom-upward manner, searching for tabular content from the bottom area of searched documents. Aspects of the invention provide a method of identifying differences among table data types and associated relationships therebetween to differentiate the last table header line within a header area and retrieve the associated table header zone which may include one or multiple table header lines.

Aspects of the invention include a normalizing module that prepares table data structures using table elements identified by the table deconstruction module. In an embodiment, the normalizing module identifies table content relationships and documents header level relationships in a header tree. According to aspects of the invention, the normalizing module generates cell attribute units that identify cell content type and scope (e.g., table region occupied). According to aspects of the invention, the normalizing module also splits and reshapes table cells based on cell scope occupied and cell content relationships. According to aspects of the invention, the normalizing module transforms composite tables to a simple (e.g., non-composite) tables, which may be further transformed into structured data objects.

According to aspects of the invention, the normalizing module generates a hierarchical header tree structure, that represents to table zone relationships from bottom to top, the header tree structure is used to facilitate shaping table and integrating data object.

Aspects of the invention also include an integration module to transform simple structured data objects to complex data objects. In an embodiment, in addition to converting a plain table to a plain data object keyed by the lowest level header elements, the integration module generates complex data objects that reflect the overall header tree structure, in addition to the lower level headers. In an embodiment, the integration module incorporates table labels and summation data content into generated complex structured data objects.

Aspects of the invention include a Process Control Manager (PCM) which manages a table data structure definition, generates table dada units and table header tree based on cells definition and structure's definition, controls table cell states throughout the table-to-structured data transformation. According to aspects of the invention, the PCM monitors cell attribute metadata. According to aspects of the invention, the attribute metadata changes as cell states changes during transformation into structured data. According to aspects of the invention, the metadata includes cell data type, identifies an associated cell table range, and indicates a next action for cell transformation, thereby increasing efficiency of table content conversion from table data to structured data objects.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 3 is an exemplary composite table with content suitable for transformation into structured data according to aspects of the invention.

FIG. 4A is a header zone from the composite table shown in FIG. 3, according to aspects of the invention.

FIG. 4B is a data zone from the composite table shown in FIG. 3, according to aspects of the invention.

FIG. 5A is a header node representing a level two header from the composite table shown in FIG. 3, according to aspects of the invention.

FIG. 5B is a header node representing a level one header from the composite table shown in FIG. 3, according to aspects of the invention.

FIG. 5C is a header node representing a level zero header from the composite table shown in FIG. 3, according to aspects of the invention.

FIG. 6 is a cell attribute unit for a cell from the composite table shown in FIG. 3, according to aspects of the invention.

FIG. 7 is a header tree structure representing a hierarchical arrangement of header cells in the composite table shown in FIG. 3, according to aspects of the invention.

FIG. 8 is a plain table representing data and header cells arranged according to aspects of the hierarchical arrangement shown in FIG. 7, according to aspects of the invention.

FIG. 13A is an exemplary tabular document containing two composite tables with content suitable for transformation into structured data according to aspects of the invention.

FIG. 13B is a representation of header zone from a composite table shown in FIG. 13A, according to aspects of the invention.

FIG. 13C is a representation of a header zone from a composite table shown in FIG. 13A, according to aspects of the invention.

FIG. 13D is a representation of a cell attribute unit for a cell from a composite table shown in FIG. 13B, according to aspects of the invention.

FIG. 13E is a schematic representation of content from a label zone in the table shown in FIG. 13B, according to aspects of the invention.

FIG. 13F is a representation of aspects of the composite table shown in FIG. 13B, with label content removed, according to aspects of the invention.

FIG. 13G is a revised, plain table representation of aspects of a composite table shown in FIG. 13B, with a reshaped header zone, according to aspects of the invention.

FIG. 17 is a complex structured data object representing content from the composite table shown in FIG. 13A, according to aspects of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
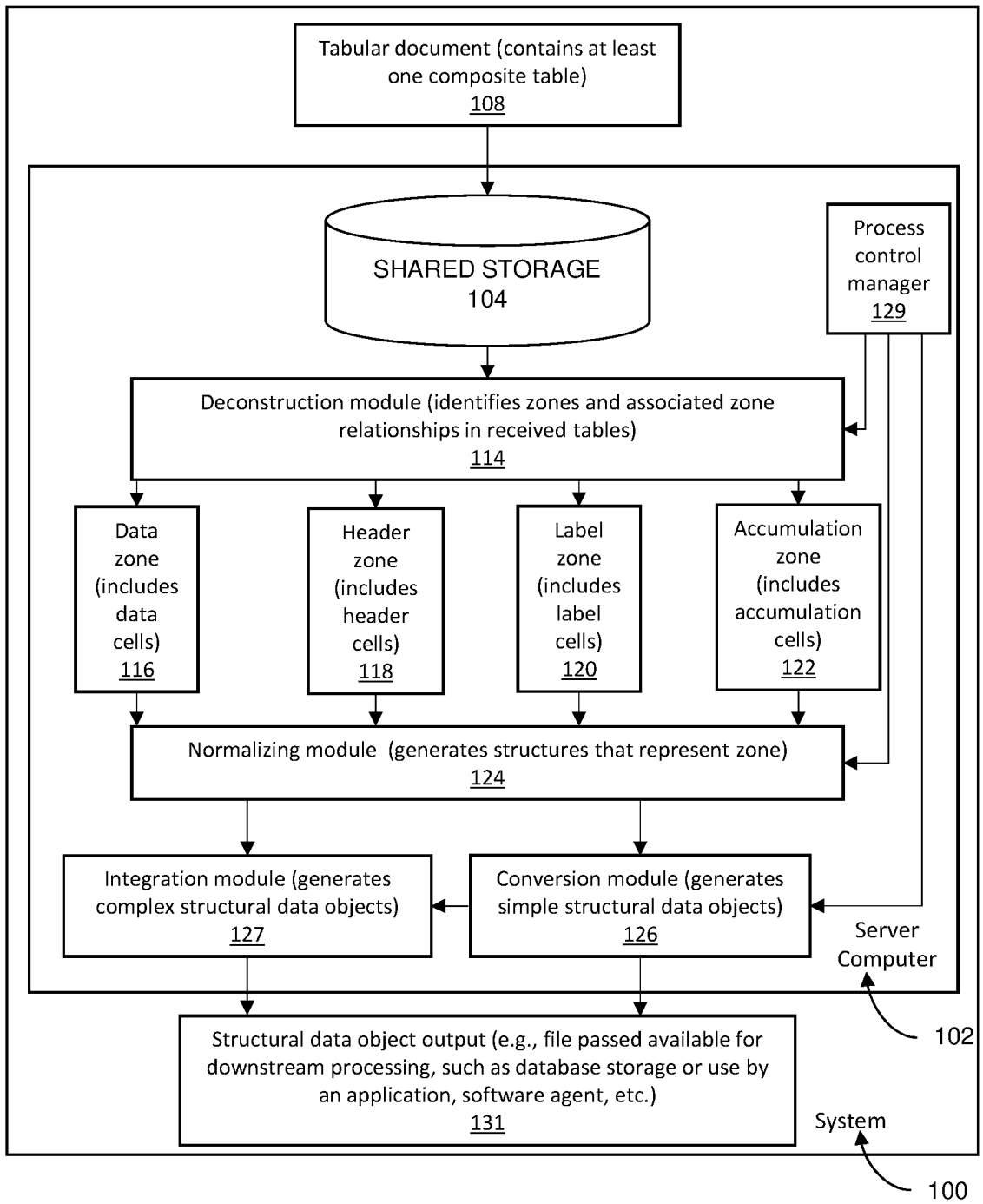
FIG. 1 is a schematic block diagram illustrating an overview of a system for computer-implemented transformation of composite table content into structured data according to embodiments of the present invention.
Figure 2:
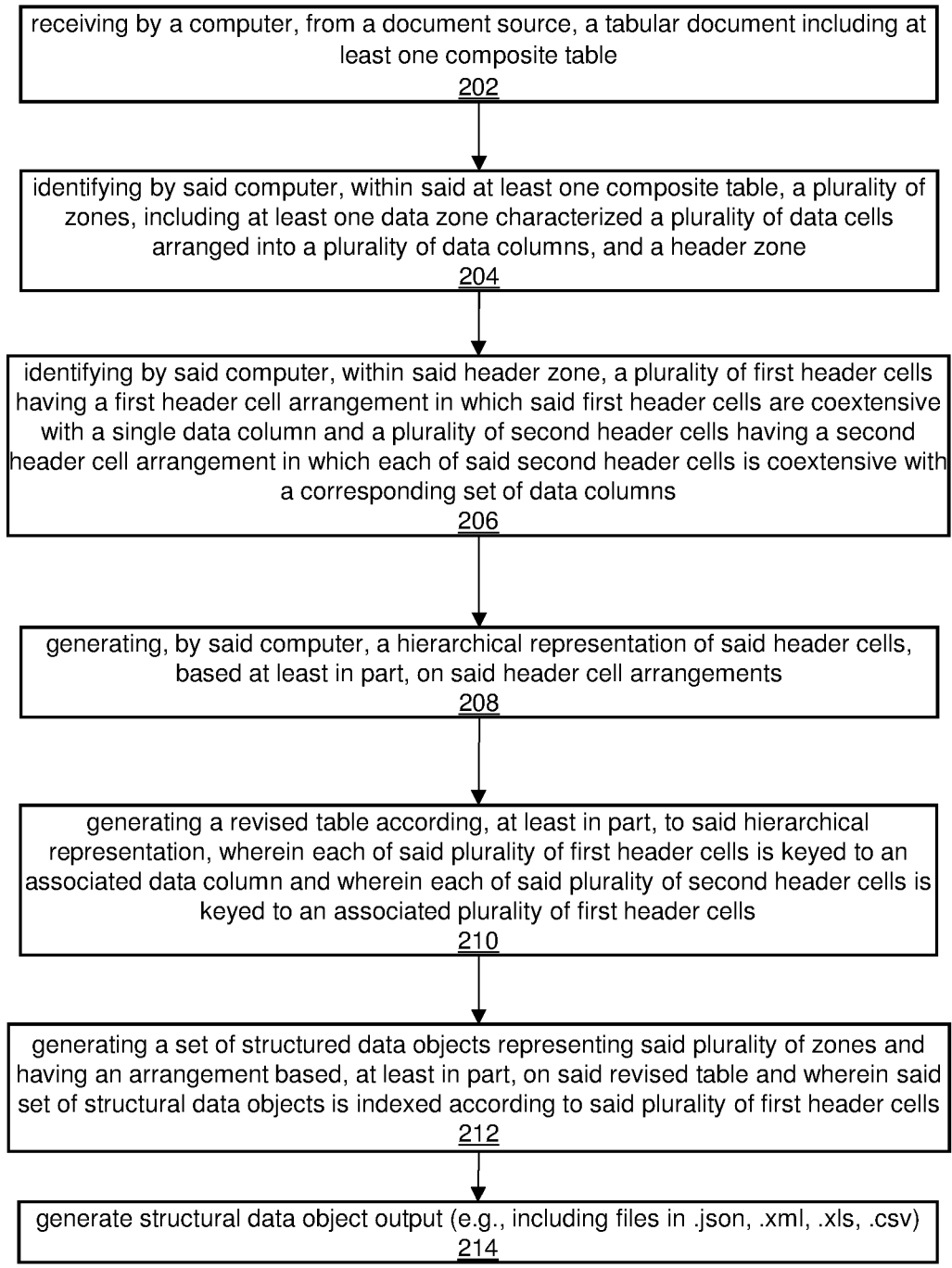
FIG. 2 is a flowchart illustrating a method, implemented using the system shown in FIG. 1, for transforming composite table content into structured data according to aspects of the invention.

Now with combined reference to the Figures generally and with particular reference to FIG. 1 and FIG. 2, an overview of a method for transforming composite table content into structured data within a system 100 as carried out by a server computer 102 having optionally shared storage 104 is shown. According to an embodiment of the present disclosure, the system 100 includes aspects that properly identify and efficiently transform content from various zones within composite tables 106 (e.g., as shown in FIG. 3 and FIG. 13A, respectively). With continued reference to FIG. 1, the server computer 102 receives one or more tabular documents 108 from a document source (not shown) which contain one or more tables 106, from which content may be extracted and transformed into structured data objects 110, 112 (e.g., as shown in FIG. 9, FIG. 10, FIG. 16, and FIG. 17). Although it is noted that in some embodiments, aspects of the present invention are especially suited for use with composite tables 106, the present system will also extract and generate structured data from plain tables. The server computer 102 includes a deconstruction module 114 that identifies various table areas, including data zones 118, header zones 116, label zones 120, and accumulation zones 122, within the tables 106. It is noted that the deconstruction module 114 may also be calibrated to identify and process other types of table areas, as determined by one skilled in this field. The server computer 102 includes a normalizing module 124 that, as will be described more fully below, prepares a variety of structures that represent aspects of the zones 16, 118, 120, 122 identified by the deconstruction module 122. The server computer 102 includes a conversion module 126 that, as will be described in more detail below, generates simple structural data objects 110 that reflect the table-representing structures generated by the normalizing module 124. The server computer 102 includes an integration module 128 that, as will be described in more detail below, generates complex structural data objects 112 that reflect the hierarchical relationships among the table zones, as well as content of table labels 120 and accumulation zones 122. According to aspects of the invention, the structural data objects 110, 112 generated by aspects of the system may be output (e.g., as a file available for use in downstream processing).

The server computer 102 includes a Process Control Manager (PCM) 129 that, as will be described more fully below, directs flow through the system 100 during table transformation.

Now with reference to FIG. 2, a flowchart illustrating a method, implemented using the system shown in FIG. 1, for transforming composite table content into structured data according to aspects of the invention will be discussed. The server computer 102 receives at block 202, from a document source, a tabular document including at least one composite table. According to aspects of the invention, the table 106 is noted for having at least one zone of headers 116 and one or more lines of conjunctive data 118 and associated with the headers. According to one convention, table contents may be arranged in a series of vertical columns identified by alphabetical column indices 128 with stacks of horizontally-aligned rows identified by numerical row indices 130. Locations within a table 106 are identified by pairs of intersecting column and row values that indicate a span of one or more columns and one or more rows occupied by the identified column and row value pair; the intersection thus identified is known commonly as a table cell or table cell range. As used herein, the term "zone" refers to one or more such cells. It is within the spirit of the embodiments of the present invention to interchange the terms "column" and "row" when identifying cells, if such use is consistent throughout the scope of a given table or set of tables, in order to allow for flexible cell locating conventions, if so desired. As referenced herein, composite tables are tables with header zones 118 having multi-line non-uniform header arrangements.

The server computer 102 identifies, by deconstruction module 114 at block 204, within the received composite table 106, a group of zones which, in one embodiment, includes at least one data zone 118 having data cells arranged into a group of vertical data columns and a related header zone 116 associated with the columns of data. For illustration purposes, this disclosure will use a cell location convention in which tables 106 are constructed with headers at the top and cell location counting beginning at an upper left corner cell of the table. In this convention, this corner cell is identified with a (column, row) location pair having a value of (0,0). Other arrangements may also suffice, and the description below can be adjusted accordingly within aspects of the invention. With an upper corner reference of (0,0), the deconstruction module 114 parses table contents in an iterative, cell-by-cell manner, preferably beginning at a lower corner which is opposite the (0,0) corner cell (e.g., at (F,5) in table 106 of FIG. 3) and iteratively analyzing cell contents in a generally upward and leftward arrangement (e.g., from cell (F,5) toward cell (0,0). As the deconstruction module 114 analyzes the content of each cell, type or function is noted, and cells are categorized according to individual cell role and, in turn, to a role for a given group or zone of cells. The server computer 102 uses several kind of analysis for this cell categorization, including semantic analysis of cell content words, category, and data relationships across among table rows and columns. The server computer 102 also considers cell appearance (e.g., font size, typeface, background color or other distinguishing attribute), cell content meaning, content word categorization, as well as related categorization methods to identify individual cell and cell group roles and hierarchical relationships among cells and cell groups or zones. According to aspects of the invention, table cells occupy one of several broad zone categories, including cell header zones 116 (which often identify associated table columns 128 and indicate the type of content present in a given table column), cell data zones 118 (which often provide values of importance to a user), label zones 120 (e.g., which, as shown in FIG. 13A, may provide ancillary information or titles for identified tables), and accumulation (e.g., which, as shown in FIG. 13A, may include column-wise or row-wise sums or totals, including sums or totals that accumulate across multiple tables 106). The server computer 102, via deconstruction module 114 in block 206, further identifies cells within noted header zone 116, noting groups of first header cells 132 having a first header cell arrangement in which the first header cells are coextensive with a single data column 128 and a group of second header cells 135 having a second header cell arrangement, in which each of the second header cells is coextensive with a corresponding set of data columns. Other header arrangements may also be identified, according to the structure of the table 106. For example, with particular reference to FIG. 3, words like "Dallas", "Atlanta", "ShiJiaZhuang" are each identified as a "City", which, semantically, are parts of an "Address".

The server computer 102, via normalizing module 124 at block 208, generates a hierarchical representation of the header cells based on the noted header cell arrangements 132, 134. According to aspects of the invention, the normalizing module 124 generates header node attribute blocks 136, examples of which are shown in FIG. 5A, FIG. 5B, and FIG. 5C, for a top or "root" level header, a mid-level header, and a low level header, respectively. In one embodiment, the header node attribute blocks 136 provide node descriptions identified as "Text", relative node hierarchy position (with level 0 representing the lowest or tree leaf node header) as "Level", an indication of node parent (with "null" representing a tree top or "root" node) as "Parent", and a cell reference value as "Cell".

The normalizing module 124 also generates metadata-based cell attribute units 138 (e.g., as shown in FIG. 6) that provide information about the cells in the table. According to aspects of the invention, the cell attribute units 138 include information about cell content names or titles, cell content values, cell content types, cell location scope or range, cell transformation action/status, cell appearance, and so forth. Cells that span multiple columns or rows, as indicated by the cell location scope metadata, (e.g., the "ID" cell 133 in FIG. 4A) is shown in FIG. 6 to have a cell attribute unit 138 that indicates, among other attributes, a "split" transformation action, thus indicating the cell occupies one column and two rows (i.e., rows 1 and 2 in column A).

With reference to FIG. 6 and FIG. 7, the normalizing module 124, using the header node attribute blocks 136 (e.g., FIG. 6), generates a header tree structure 138 that represents the hierarchical relationship among the various header cells. The header tree structure 140 relates cell header arrangements 132, 134 to one another and provides a path through each header level (e.g., from low level headers 142, to mid-level headers 144 through to the table root 146.

With continued reference to FIG. 2 and with additional reference to FIG. 8, the server computer 102, via the normalizing module 124 at block 210 revises the original composite table 106 (e.g., as shown in FIG. 3) into a plain table 146 (e.g., as shown in FIG. 8) that represents the underlying header tree structure 140.

In the plain (i.e., revised) table of FIG. 8, each of the table header cells occupies one table cell, with some cells 134 (e.g., those that originally spanned multiple columns, like the double-wide "Name" header) having been split and repeatedly entered across single cells. Header cells 132 that occupy two rows in a single column (originally shown as the double-height "ID" header) are split horizontally to provide a path to the table root. According to aspects of the inventions, this revising is beneficial, as it transforms the original composite table into a plain table, in which each column has a unique lowest level header, and each header has a path to the root of table. Through this table revising, aspects of the present invention advantageously convert a composite table (e.g., a table a having non-uniform header cell distribution), from which automated header and data cell content extraction is difficult, into a table which is a suitable for use with known data extraction techniques, thereby increasing accuracy and efficiency of structured data generation. By facilitating this transformation of composite tables into plain tables, aspects of the present invention expand the range of documents for which efficient, automated structured data generation is practical.

Figure 9:
FIG. 9 is a simple structured data object representing content from the plain table shown in FIG. 8, according to aspects of the invention.

With reference to FIG. 2 and FIG. 9, the server computer 102, via conversion module 126 at block 212 generates a simple structured data object 110 using the lowest level headers 142 as keys. Many known data image capture and conversion tools can assist with generating this structured data, including the product known as "IBM DataCap" and this group of tools may provide electronic file output 131 at block 214 in a variety of file formats (including, .json, .xml, .xls, .csv, etc.) appropriate for use in downstream computer applications or stored for further processing and reference as need to support user requirements.

Figure 10:
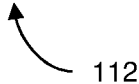
FIG. 10 is a complex structured data object representing content from the plain table shown in FIG. 8, according to aspects of the invention.

Now with additional to FIG. 2 and FIG. 10, it is noted that the server computer 102, may via integration module 127 generate a complex structured data object 112 based on the overall header tree structure 140, thus representing the entire hierarchical structure that links the headers zones 116 and data zones 118. Many known data image capture and conversion tools can assist with generating this structured data, including the product known as "IBM DataCap" and this group of tools may provide electronic file output 131 at block 214 in a variety of file formats (including, .json, .xml, .xls, .csv, etc.) appropriate for use in downstream computer applications or stored for further processing and reference as need to support user requirements.

Figure 11:
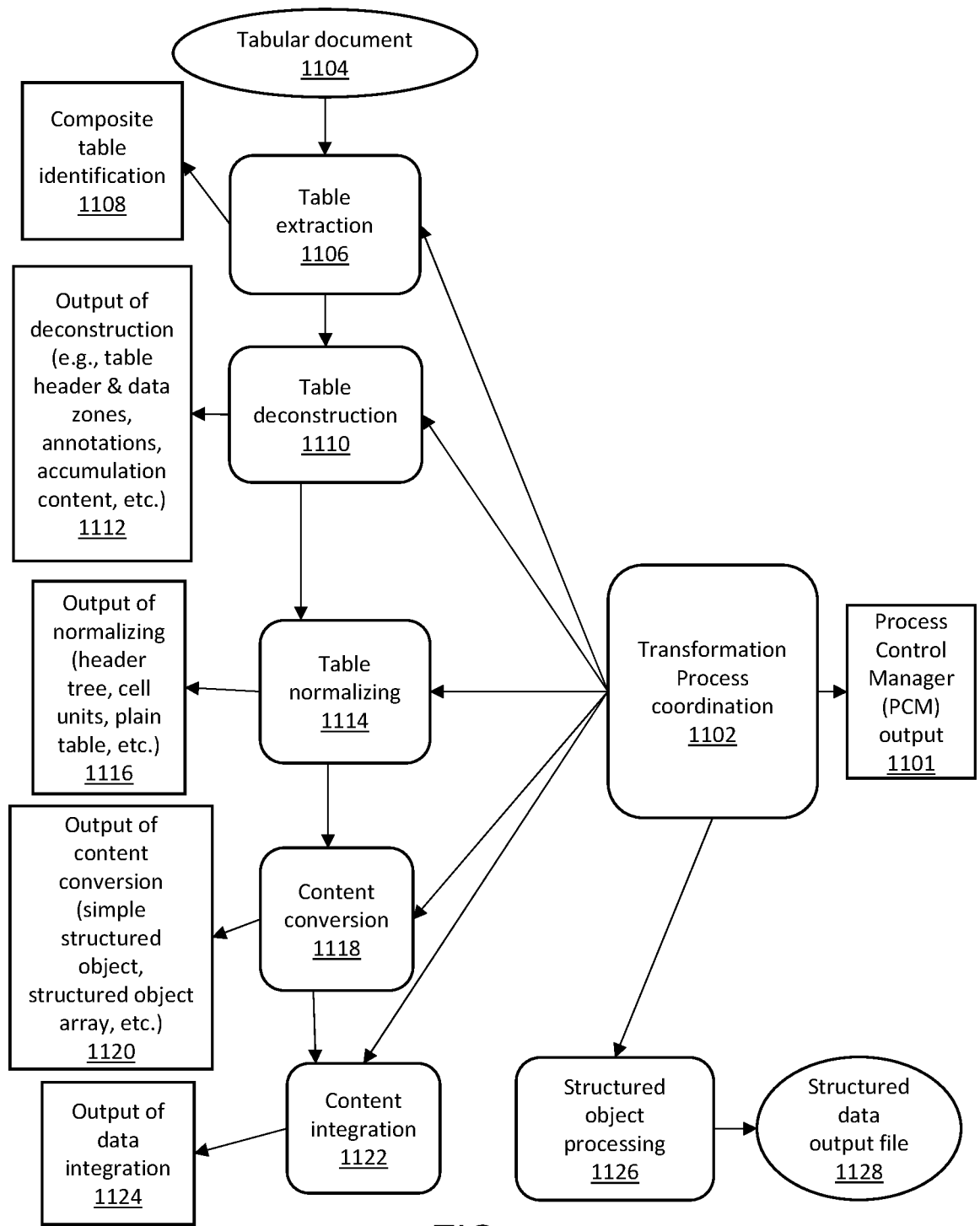
FIG. 11 is a schematic representation of a process control module directing flow through the system shown in FIG. 1, according to aspects of the invention.

Now with reference to FIG. 11, a schematic representation of a process control module directing flow through the system shown in FIG. 1, according to aspects of the invention will be described. The server computer 102, via Process Control Manager (PCM) 129 at block 1102 initiates composite table transformation. PCM 129 requests one or more tabular documents 108 from a document source, and directs the table extraction at block 1106 using any suitable table identification routine selected by one skilled in this field, and one or more composite tables 106 are identified at block for further transformation according to aspects of the invention. PCM 129 directs the deconstruction module 114, at block 1110 to identify zones 114, 116, 118, 120 within the composite tables 106. The PCM 129 collects output of the deconstruction module 114 (e.g., table header zones, data zones, annotation labels, accumulation content, etc.) is collected in block 1112. The PCM 129 directs the normalizing module 124, at block 1114 to generate table structure elements that represent the table structure and relationships identified by the deconstruction module 114. The PCM collects normalizing module output (including (header tree, cell units, plain table, etc.) in block 1116. The PCM 129 directs, via conversion module 126 at block 1118, the generation of simple structured data objects 110. PCM 129 collects output (e.g., simple structured objects 110) from the conversion module 126 in block 1120. The PCM 129 directs, via integration module 127 at block 1122, the generation of complex structured data objects 112. PCM 129 collects output (e.g., complex structured objects 112) from the conversion module 126 in block 1124. The PCM 129 directs, via known file generation routines at block 1126, the generation of data files representing selected structured data objects 110,112. PCM 129 provides output (e.g., structured data objects in selected file formats appropriate (e.g., .json, .xml, .xls, .csv, etc.) for use in downstream computer applications or stored for further processing and reference, as need to support user requirements, at block 1128.

Figure 12:
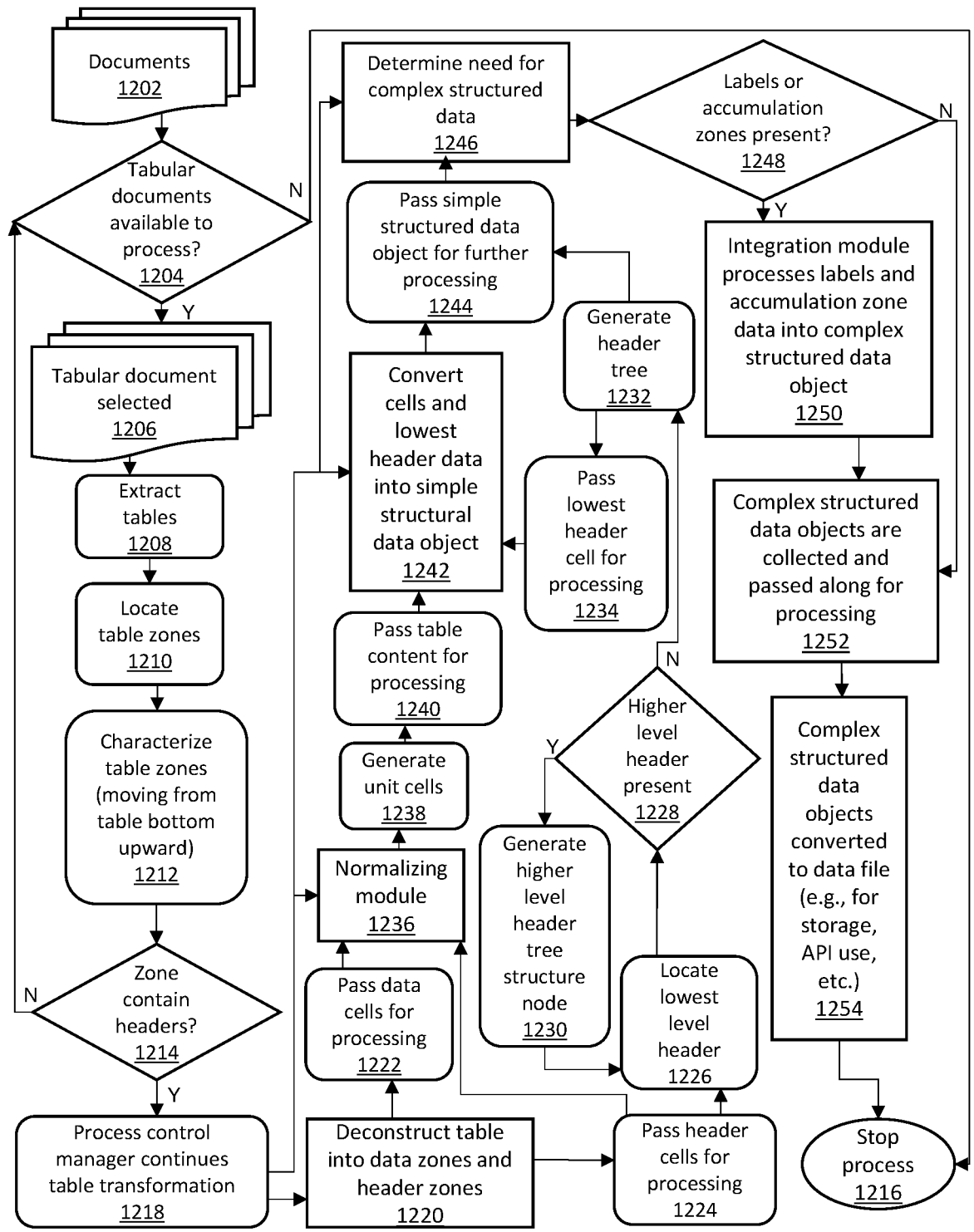
FIG. 12 is a flowchart showing aspects of an embodiment of content conversion for several tabular documents using components of the system shown in FIG. 1, according to aspects of the invention.
Figures 14, 15A, 15B:
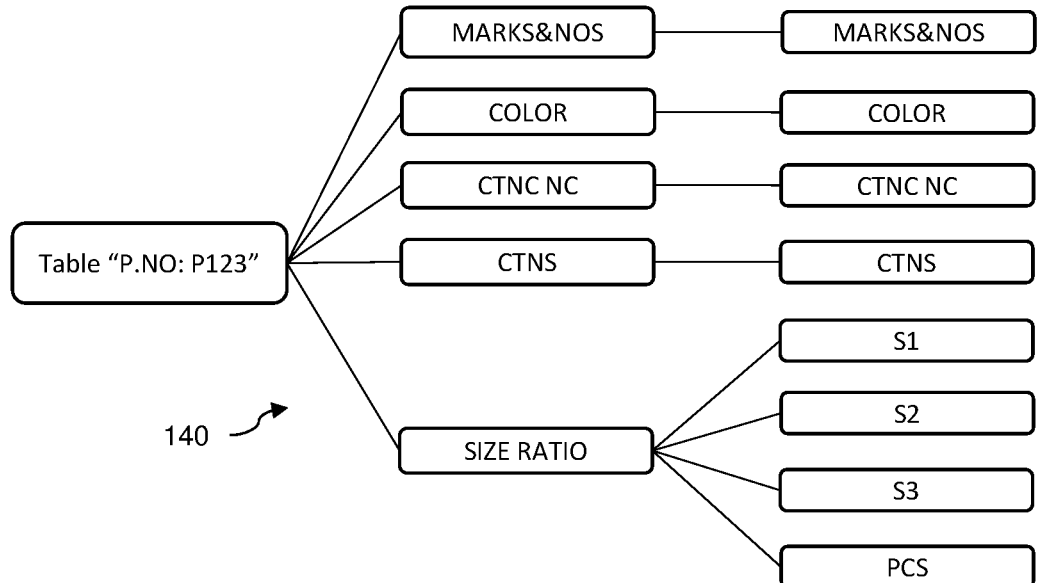
FIG. 14 is a header tree structure representing a hierarchical arrangement of a label and header cells from in the composite table shown in FIG. 13B, according to aspects of the invention.
FIG. 15A is re-shaped, plain table representation of a first composite table shown in FIG. 13A, according to aspects of the invention.
FIG. 15B is re-shaped, plain table representation of a second composite table shown in FIG. 13A, according to aspects of the invention.
Figure 16:
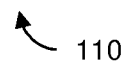
FIG. 16 is a simple structured data object representing content from the plain table shown in FIG. 15A, according to aspects of the invention.

Now with reference to FIG. 12, a flowchart showing aspects of an embodiment of content conversion for several tabular documents using components of the system shown in FIG. 1 will be described. The server computer 102 is in communication with a source of documents at block 1202. The server computer 102 determines at block 1204 whether tabular documents 108 available for processing. If tabular documents 108 are available for processing, the server computer 102 receives an available document in block 1206. The server computer identifies tables for processing at block 1208 and passes the tables on to the deconstruction module 114 for zone location at block 1210. The server computer 102, via deconstruction module 114 at block 1212, characterizes table zones (moving from table bottom upward). The server computer 102 considers, at block 1214, whether header zones are present in the current table 106. If no header zones 116 are present, the server computer 102 returns flow to block 1204, where another document is selected if available. If all available documents have been processed, the server computer directs flow to block 1216 and processing stops. However, if the server computer identifies header zones at block 1214, the Process Control Manager (PCM) 129 continues table transformation from block 1218. The server computer 102 deconstructs the table 106 to header zones 116 and data zones 118; the data zone cells are passed directly to the normalizing module via block 1222, and the header zone cells are forwarded for header zone processing through block 1224. The server computer 102 identifies table header levels (e.g., in FIG. 13B and FIG. 13C) through blocks 1226, 1228, 1230, in which the lowest level header arrangement is identified (block 1226), higher level header arrangements are identified, if present (block 1228), and header tree node attribute blocks 136 are generated for each header level (block 1230). The server computer 102 processes the header tree node attribute blocks 136 and generates a hierarchical header tree structure in block 1232.

The normalizing module 124 receives header and data cell metadata at block 1236, and generates unit cells (e.g., cell attribute blocks) in block 1238. The server computer 102 passes table content for processing from block 1240, where it is combined in block 1242 with lowest header cells 142 into a plain table and simple structured data object keyed by the lowest level header cells.

The server computer 102 passes the simple structured data object 110 and header tree structure 140 for further processing at block 1246, where the server computer determines whether a complex structured data object is appropriate. At block 1248, the server computer 102 determines whether labels 120 (as shown in FIG. 13A) as identified by exemplary label cell attribute unit 150 (e.g., as shown in FIG. 13D) or accumulation data 122 (e.g., as shown in FIG. 13A) are present. If a table includes labels 120 or accumulation data 122, these are passed to the integration module 127 where they are combined with associated simple structured data objects 110 to form complex structured data objects 112. In particular, labels (such as "P.NO:P123") are recognized as informal (e.g., title) information via semantic analysis and data relationship analysis. Label text is does not match other table content or belong to identified header zones. The decomposition module identifies this king of content as a label (as seen in label cell attribute unit 150). With labels removed, from header zones 106 (as shown in FIGS. 13E and 13F, collectively), plain tables 146 (as seen in FIG. 13G) is generated. The server computer 102 may incorporate the label data in the plain table structure 146 via integration module 127. The server computer 102 converts the plain table content (including labels and accumulation data) into a complex structured data object 112, using known table conversion utilities, in block 1250, collected and passed along for further possible further processing at block 1252. The collected complex structured data objects 112 are converted into data files (e.g., for storage, API use, etc.) at block 1254, and the process stops at block 1216 once all tables have been processed as appropriate.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 18:
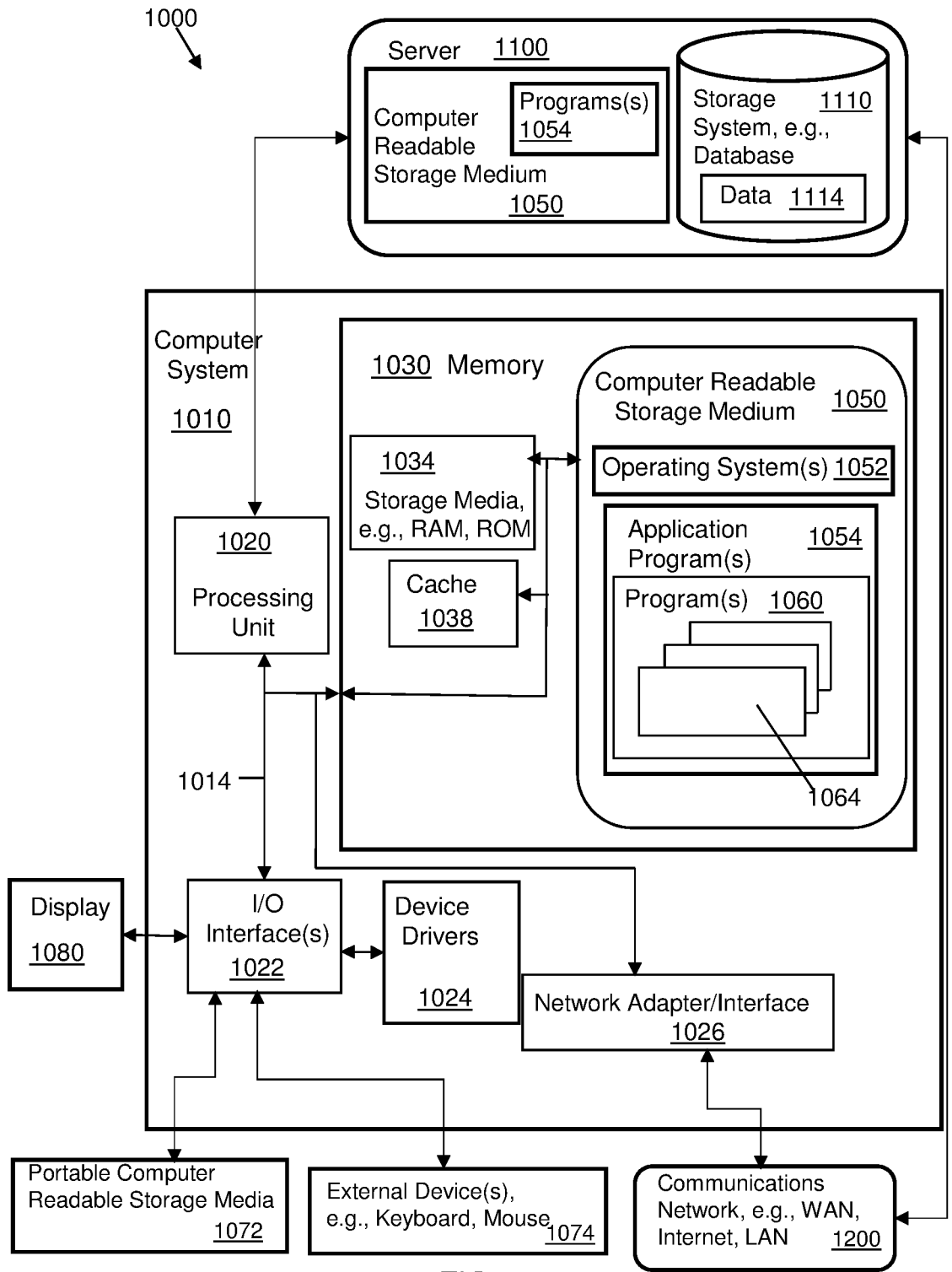
FIG. 18 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 18, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media.

Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 19:
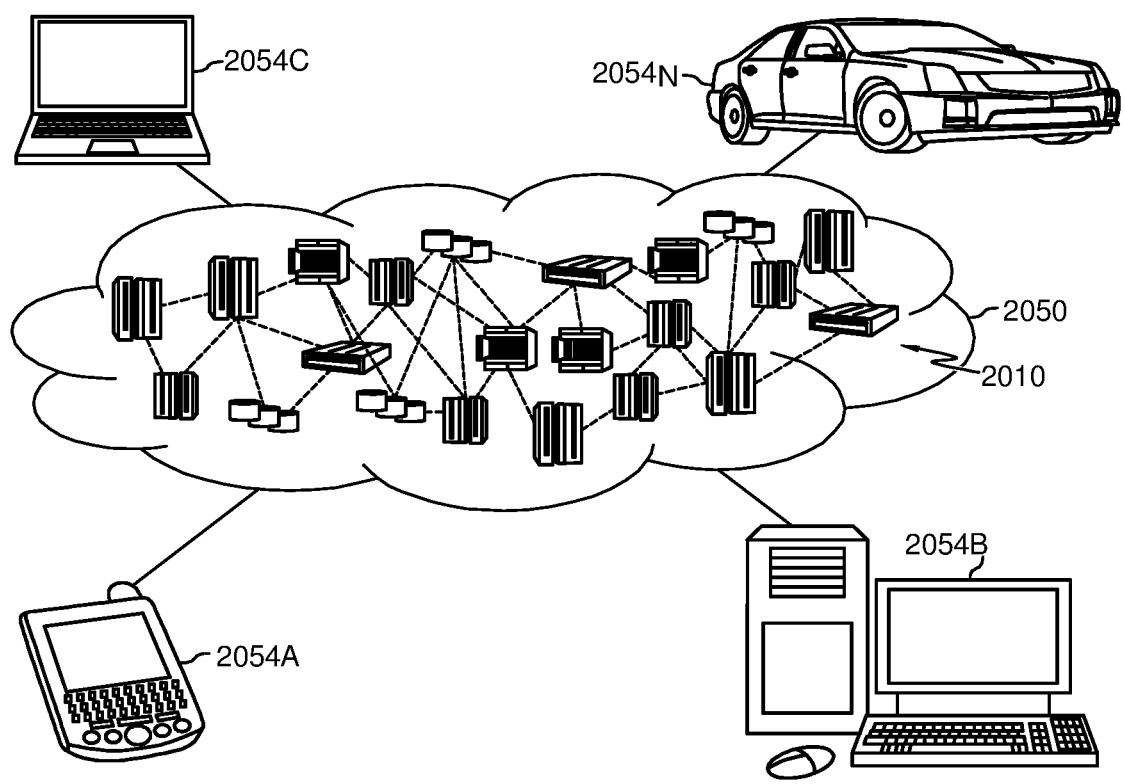
FIG. 19 depicts a cloud computing environment according to an embodiment of the present invention.

Referring now to FIG. 19, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 19 are intended to be illustrative only and that computing nodes 2010 and cloud computing environment 2050 can communicate with any type of computerized device over any type of network and/or network addressable connection (e.g., using a web browser).

Figure 20:
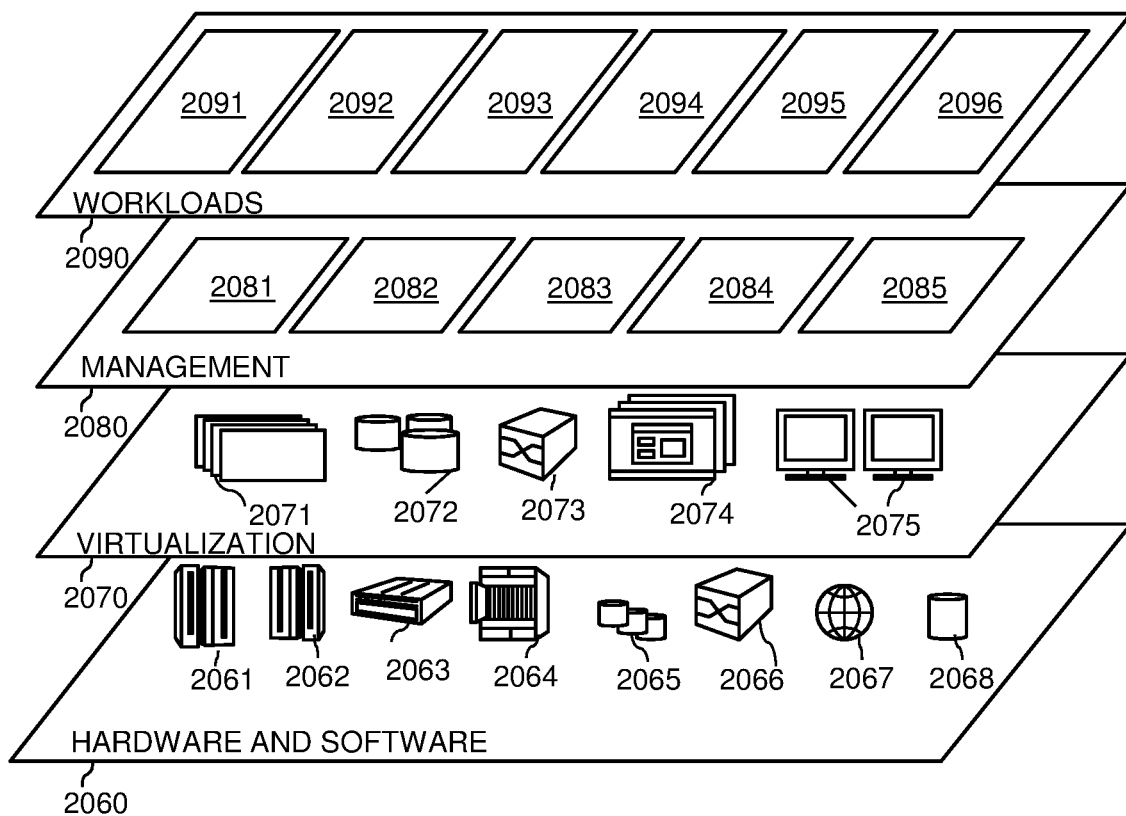
FIG. 20 depicts abstraction model layers according to an embodiment of the present invention.

Referring now to FIG. 20, a set of functional abstraction layers provided by cloud computing environment 2050 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and transforming composite table content into structured data 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to transform content of a composite table into structured data objects, comprising:
receiving by a computer, from a document source, a document including a composite table;
identifying by said computer, within said table, a data zone characterized a plurality of data cells arranged into a plurality of data columns, and a header zone;
identifying by said computer, within said header zone, a plurality of first header cells which are coextensive with a single data column and a plurality of second header cells which are coextensive with a set of data columns;
generating, by said computer, a hierarchical representation of said header cells, based at least in part, on said header cell arrangements;
generating a header tree structure that represents the hierarchical representation among the plurality of first header cells and the plurality of second header cells, the header tree structure relating cell header arrangements to one another and providing a path through each header level through to a table root;
generating, by said computer, a revised table according, at least in part, to said hierarchical representation, wherein the first header cells identify a data column and said second header cells identify a first header cell; and
generating, by said computer, a set of structured data objects representing said zones and having an arrangement based, at least in part, on said revised table and wherein said set of structured data objects is keyed to said plurality of first header cells.

2. The method of claim 1, wherein said set of structured data objects is further indexed according to said plurality of second header cells.

3. The method of claim 1, wherein:
- said at least one composite table further includes at least additional one zone having content selected from a list of categories consisting of "table label" and "table accumulation data"; and
- further including mapping said additional zone content to said revised table, wherein said set of structured data objects includes a representation of additional zone content.

4. The method of claim 1, wherein said identification of said plurality of zones is conducted by iteratively assessing content of said tabular document in a bottom-to-top direction, whereby said at least one data zone is identified before said at least one header zone is identified.

5. The method of claim 1, further including documenting, by said computer, cell attribute metadata for said plurality of data cells and header cells, said cell attribute metadata being selected from a list consisting of "cell content name", "cell content value", "cell content type", "cell location range", "cell transformation action", "cell appearance" and using said attribute metadata to generate said hierarchical structure.

6. The method of claim 5, wherein said set of structured data objects is generated by said computer based, as least in part, on said cell attribute metadata.

7. The method of claim 1, wherein said header cell arrangements are identified by said computer based, at least in part, by examining at least one attribute associated with said header zones selected from a list consisting of "semantic relationship among first header cells and said second header cells determined by a natural language processing method", and a cell content meaning established in a reference available to the computer.

8. A system to transform content of a composite table into structured data objects, which comprises:
- a computer system comprising a computer readable storage medium having program instructions embodied therewith, the program instructions executable by a computer to cause the computer to:
- receive, from a document source, a document including a composite table;
- identify, within said table, a data zone characterized a plurality of data cells arranged into a plurality of data columns, and a header zone;
- identify, within said header zone, a plurality of first header cells which are coextensive with a single data column and a plurality of second header cells which are coextensive with a set of data columns;
- generate, a hierarchical representation of said header cells, based at least in part, on said header cell arrangements;
- generate a header tree structure that represents the hierarchical representation among the plurality of first header cells and the plurality of second header cells, the header tree structure relating cell header arrangements to one another and providing a path through each header level through to a table root;
- generate, a revised table according, at least in part, to said hierarchical representation, wherein the first header cells identify a data column and said second header cells identify a first header cell; and
- generate, a set of structured data objects representing said zones and having an arrangement based, at least in part, on said revised table and wherein said set of structured data objects is keyed to said plurality of first header cells.

9. The system of claim 8, wherein said set of structured data objects is further indexed according to said plurality of second header cells.

10. The system of claim 8, wherein:
- said at least one composite table further includes at least additional one zone having content selected from a list of categories consisting of "table label" and "table accumulation data"; and
- further including instructions causing the computer to map said additional zone content to said revised table, wherein said set of structured data objects includes a representation of additional zone content.

11. The system of claim 8, wherein said identification of said plurality of zones is caused by instructions causing said computer to iteratively assessing content of said tabular document in a bottom-to-top direction, whereby said at least one data zone is identified before said at least one header zone is identified.

12. The system of claim 8, further including documenting cell attribute metadata for said plurality of data cells and header cells, said cell attribute metadata being selected from a list consisting of "cell content name", "cell content value", "cell content type", "cell location range", "cell transformation action", "cell appearance"; and
- instructions causing said computer to use said attribute metadata to generate said hierarchical structure.

13. The system of claim 12, wherein said set of structured data objects is based, as least in part, on said cell attribute metadata.

14. The system of claim 8, wherein said header cell arrangements are identified by said computer based, at least in part, by examining at least one attribute associated with said header zones selected from a list consisting of "semantic relationship among first header cells and said second header cells determined by a natural language processing method", and a cell content meaning established in a reference available to the computer.

15. A computer program product to transform content of a composite table into structured data objects, comprising a computer readable storage medium having program instructions embodied therewith, the program instructions executable by a computer to cause the computer to:
- receive using a computer, from a document source, a document including a composite table;
- identify, using the computer, within said table, a data zone characterized a plurality of data cells arranged into a plurality of data columns, and a header zone;
- identify, using the computer, within said header zone, a plurality of first header cells which are coextensive with a single data column and a plurality of second header cells which are coextensive with a corresponding set of data columns;
- generate, using the computer, a hierarchical representation of said header cells, based at least in part, on said header cell arrangements;
- generate a header tree structure that represents the hierarchical representation among the plurality of first header cells and the plurality of second header cells, the header tree structure relating cell header arrangements to one another and providing a path through each header level through to a table root;
- generate, using the computer, a revised table according, at least in part, to said hierarchical representation, wherein the first header cells identify a data column and said second header cells identify a first header cell; and
- generate, using the computer, a set of structured data objects representing said zones and having an arrangement based, at least in part, on said revised table and wherein said set of structured data objects is keyed to said plurality of first header cells.

16. The computer program product of claim 15, wherein said set of structured data objects is further indexed according to said plurality of second header cells.

17. The computer program product of claim 15, wherein:
said at least one composite table further includes at least additional one zone having content selected from a list of categories consisting of "table label" and "table accumulation data"; and
further including instructions causing the computer to map said additional zone content to said revised table, wherein said set of structured data objects includes a representation of additional zone content.

18. The computer program product of claim 15, wherein said identification of said plurality of zones is caused by instructions causing said computer to iteratively assessing content of said tabular document in a bottom-to-top direction, whereby said at least one data zone is identified before said at least one header zone is identified.

19. The computer program product of claim 15, further including instructions causing the computer to document cell attribute metadata for said plurality of data cells and header cells, said cell attribute metadata being selected from a list consisting of "cell content name", "cell content value", "cell content type", "cell location range", "cell transformation action", "cell appearance"; and
instructions causing said computer to use said attribute metadata to generate said hierarchical structure.

20. The computer program product of claim 15, wherein said header cell arrangements are identified by said computer based, at least in part, by examining at least one attribute associated with said header zones selected from a list consisting of "semantic relationship among first header cells and said second header cells determined by a natural language processing method", and a cell content meaning established in a reference available to the computer.

* * * * *